W. J. MILLER.
REVERSIBLE CHUCK JAW.
APPLICATION FILED MAY 22, 1916.

1,261,265.

Patented Apr. 2, 1918.
2 SHEETS—SHEET 1.

William J. Miller
Inventor

By Geo. P. Kimmel
Attorney

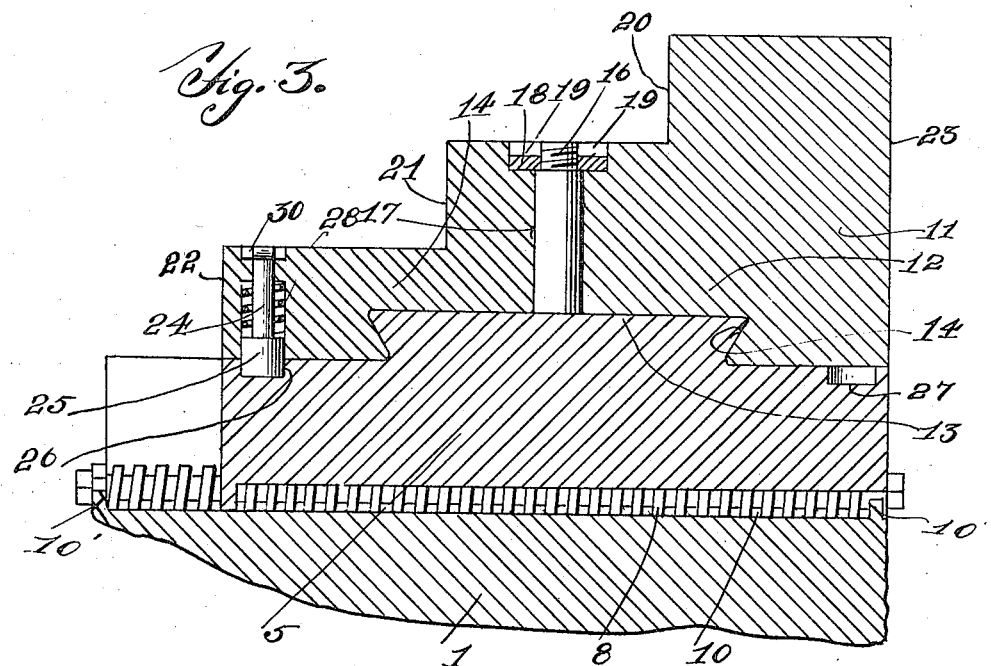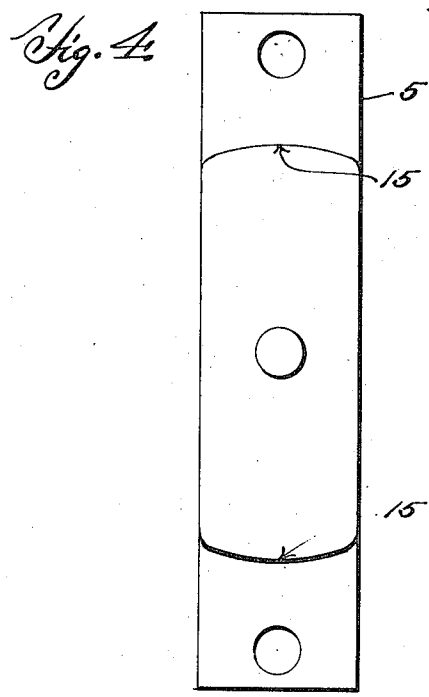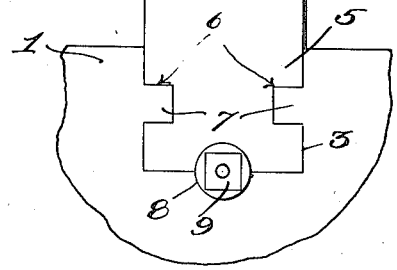

UNITED STATES PATENT OFFICE.

WILLIAM J. MILLER, OF ORANGE, TEXAS, ASSIGNOR OF ONE-HALF TO ASA OTIS, OF ORANGE, TEXAS.

REVERSIBLE CHUCK-JAW.

1,261,265.   Specification of Letters Patent.   Patented Apr. 2, 1918.

Application filed May 22, 1916. Serial No. 99,150.

*To all whom it may concern:*

Be it known that I, WILLIAM J. MILLER, a citizen of the United States, and resident of Orange, in the county of Orange and State of Texas, have invented certain new and useful Improvements in Reversible Chuck-Jaws, of which the following is a specification.

The present invention relates to new and useful improvements in lathe chucks and has particular reference to an improved type of reversible chuck jaw.

The primary object of my invention is to provide a chuck jaw capable of application to any of the standard types of chucks now in use, which jaw is reversible for the purpose of reducing or enlarging the chuck for engagement with objects of varying sizes.

Another object of my invention is to provide a chuck jaw of the class described having improved locking means associated therewith for retaining the same in the position to which it is moved.

Another object of my invention is to provide a reversible chuck jaw which may be applied to any standard type of chuck without materially altering the chuck structure, the jaw being formed preferably in two sections, one hinged upon the other for the reversing of the same.

Other objects and advantages to be derived from the use of my improved reversible chuck jaw will appear from the following detail description and the claim, taken with an inspection of the accompanying drawings, in which:—

Fig. 3 is a longitudinal sectional view taken on the line 3—3 of Fig. 1 looking in the direction of the arrows;

Fig. 4 is a plan view of the lower section of my improved reversible jaw; and

Fig. 5 is an outer end elevational view of the jaw.

Figure 1:
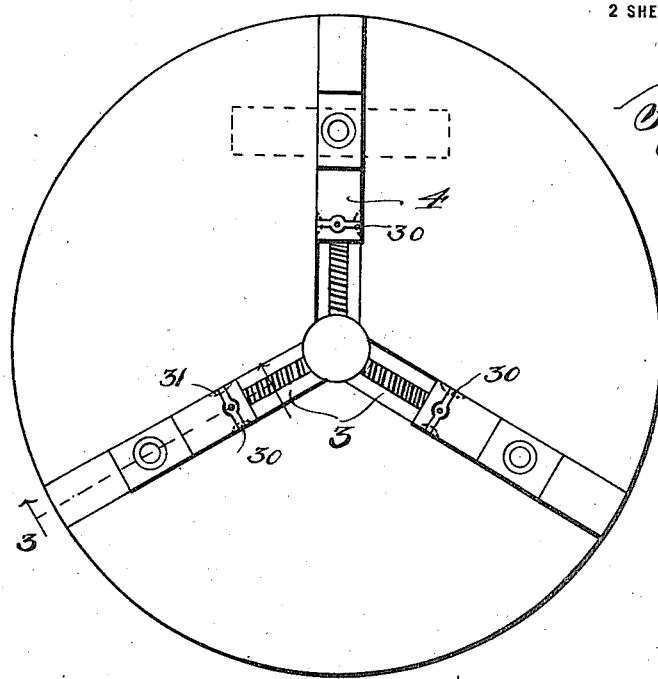
Figure 1 is a front elevational view of a chuck embodying the improvements of my invention.
Figure 2:
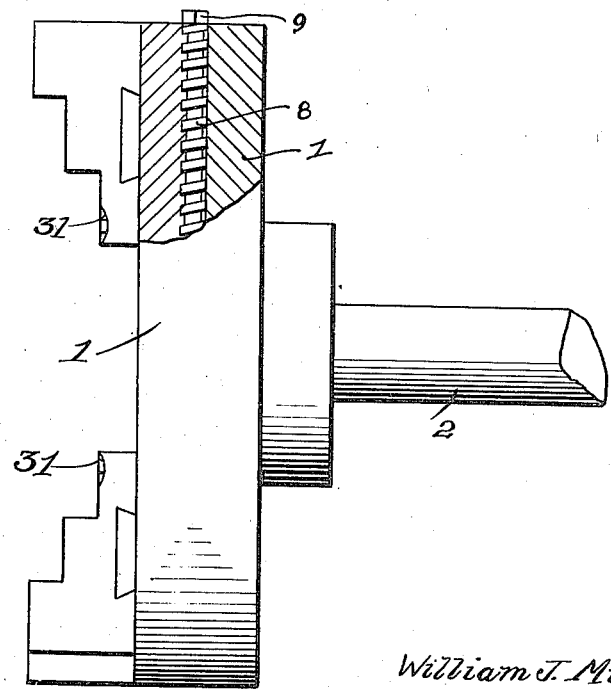
Fig. 2 is a side elevational view of the same.

Referring more particularly to the drawings, wherein similar characters of reference designate like and corresponding parts throughout the various views, 1 designates the chuck body and 2 the driving and supporting shaft therefor. The front face of the chuck body 1 is provided with a plurality of radially extending grooves 3 which receive the jaws, said jaws being designated 4 in their entireties and being identical in construction, therefore, a description of one of the jaws will suffice. It is of course, to be understood that any number of jaws may be provided, three being shown.

The improved chuck jaw of my invention includes a base portion 5 provided along the side faces thereof with grooves 6 engaging with complementally formed flanges 7 carried by the side walls of the groove 3. For moving the base portion 5 longitudinally in its respective groove I provide a screw 8 having a squared head 9 on the outer end thereof, said screw engaging in threads formed in the base 5, a groove 10 being provided in the body 1 to accommodate the screw, lugs 10' preventing longitudinal movement of the screw. The threads in the body and the complementally arranged threads on the jaw are half-threads, the same coöperating with the screw 8 to move the jaws into engagement with an object to be held.

The object engaging portion of the improved jaw of my invention includes a body 11 having a recess 12 for reception of an enlargement 13 formed on the base 5, the end portions of said recess and said enlargement being in snug engagement as at 14, the same being curved as indicated at 15 in Fig. 4. The enlargement 13 is formed with a bearing trunnion 16 engaging through a complementally arranged opening 17 in the body 11, a counter-sunk nut 18 having grooves 19 therein being provided for the purpose of retaining said body on said base 5. A spanner wrench may be employed for removing the nut 18 when desired. The body 11 on its outer face is provided with gripping jaws 20 and 21, the inner end of the body 11 forming a further gripping jaw 22. Of course, it will be understood that any number of the gripping jaws may be employed, said jaws being formed by recessing in stepped relation the outer face of the body 11. It will be seen that the body 11 may be swung upon the body 5 for reversing the jaws, the larger end of the body and the vertical wall thereof designated 23, forming another gripping jaw. It will be seen that by swinging the body 11 on the base 5 that the jaws 20 to 22 or 23 may be moved into engagement with an object to be held. This removes the objectionable feature of many chucks when gripping small objects, it being necessary in the usual form of chucks to operate the screw adjusting mechanism, this requiring considerable time.

The body 11 is retained in the position to which the same is moved by means of a vertically movable rod 24 having an enlargement 25 on the lower free end thereof. Recesses 26 and 27 are provided in the base 5 adjacent the opposite ends thereof to receive the enlarged portion 25 of said rod 24. The rod is operable in a recess 28 formed in the body 11, a spring 29 being arranged behind the enlargement 25 for forcing the same downwardly. The upper end of the rod 24 carries a transverse bar 30, the free ends of which extend to the marginal edges of the said body, recesses 31 being provided in said body adjacent the free ends of said arm to permit engagement of the operator's fingers therewith. This permits raising and lowering of the rod and thereby disengagement and engagement of the enlargement 25 with the recesses 26 and 27.

It will be readily apparent that any desired operating mechanism may be employed in connection with my improved jaw for adjusting the same, the screw mechanism shown being of the independent type, that is, the jaws being independently adjustable. In the standard type of chucks now employed all of the jaws are simultaneously adjustable from a single point. My improved jaw is as readily applicable to this type of chuck as to the older types, therefore, I do not desire to be limited to any specific showing made concerning the adjusting mechanism for the jaw. I, however, do desire to lay particular stress upon the new and improved reversing mechanism for the jaw. It will be seen that a great deal of time may be saved in using my improved chuck jaw when gripping a small object after the chuck has been used for gripping a larger object. It will thus be seen that I have provided an effective chuck jaw which is, when in use, capable of wide adjustment, this flexibility of operation facilitating the application of the chuck jaw to various types of chucks. However, I do not limit myself to the use of my improved jaw on a chuck since the same may be readily modified for use in other capacities.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

A chuck jaw of the class described including a base, a top portion having gripping jaws thereon, a bearing trunnion projecting upwardly from said base and receivable through the top whereby said top is reversible, said base having recesses therein adjacent its opposite ends, the top having a vertical opening therethrough adapted to aline at times with said recesses, a spring pressed locking pin in said opening having an enlarged lower end for engagement with one of the recesses, and a transverse bar through the upper end of said pin countersunk in the top to permit withdrawal of the pin whereby the top may be reversed.

In testimony whereof, I affix my signature hereto.

WILLIAM J. MILLER.